United States Patent
Goldovsky et al.

[11] Patent Number: 6,122,655
[45] Date of Patent: Sep. 19, 2000

[54] EFFICIENT USE OF INVERTING CELLS IN MULTIPLIER CONVERTER

[75] Inventors: Alexander Goldovsky, Philadelphia; Ravi Kumar Kolagotla, Lansdale, both of Pa.

[73] Assignee: Lucent Technologies Inc., Murray Hills, N.J.

[21] Appl. No.: 09/079,642

[22] Filed: May 15, 1998

[51] Int. Cl.[7] ........................................ G06F 7/52
[52] U.S. Cl. ............................................. 708/626
[58] Field of Search ............................ 708/626, 630, 708/714

[56] References Cited

U.S. PATENT DOCUMENTS

| | | |
|---|---|---|
| 4,748,583 | 5/1988 | Noll ........................... 708/626 |
| 5,146,421 | 9/1992 | Adiletta ....................... 708/626 |
| 5,159,568 | 10/1992 | Adiletta et al. ................ 708/626 |
| 5,586,071 | 12/1996 | Flora .......................... 708/626 |
| 5,699,286 | 12/1997 | Lee et al. ..................... 708/626 |
| 5,928,317 | 6/1999 | Fadavi-Ardekani ............... 708/626 |

*Primary Examiner*—David H. Malzahn
*Attorney, Agent, or Firm*—David L. Smith

[57] ABSTRACT

A multiplier generates an array of partial products. The partial products are reduced in a converter having cells defining rows and columns. Cells adjacent to adders alternate between a cell that provides non-inverted outputs and a cell that provides inverted outputs, such that alternate rows of cells operate on non-inverted data and the intervening rows of cells operate on inverted data. A multiplexer for receiving the outputs from a row of cells may be an inverting multiplexer or a non-inverting multiplexer depending on the cell arrangement.

15 Claims, 6 Drawing Sheets

$A = \overline{S+C}$
$G = S \cdot C$
$ZO = S \oplus C$
$OO = S \odot C$

FIG. 4

$A = \overline{S+C}$
$G = S \cdot C$
$ZO = \overline{S \oplus C} = S \odot C$
$OO = \overline{S \odot C} = S \oplus C$

FIG. 5

$\overline{ZO} = ZI \cdot \overline{G} + OI \cdot G$
$\overline{OO} = ZI \cdot A + OI \cdot \overline{A}$

$A = \overline{S_{k-1} \cdot (S_k + C_k)}$
$G = S_{k-1} \cdot S_k \cdot C_k$
$ZO_k = S_k \oplus C_k$
$OO_k = S_k \otimes C_k$
$ZO_{k-1} = S_{k-1} \oplus (S_k \cdot C_k)$
$OO_{k-1} = S_{k-1} \oplus (S_k + C_k)$

FIG. 8

$A = \overline{S_{k-1} \cdot (S_k + C_k)}$
$G = S_{k-1} \cdot S_k \cdot C_k$
$ZO_k = \overline{S_k \oplus C_k} = S_k \odot C_k$
$OO_k = \overline{S_k \otimes C_k} = S_k \oplus C_k$
$ZO_{k-1} = \overline{S_{k-1} \oplus (S_k \cdot C_k)}$
$OO_{k-1} = \overline{S_{k-1} \oplus (S_k + C_k)}$

FIG. 9

EFFICIENT USE OF INVERTING CELLS IN MULTIPLIER CONVERTER

FIELD OF THE INVENTION

This invention relates generally to multipliers and particularly to multipliers having left-to-right converters.

BACKGROUND OF THE INVENTION

Multipliers are special purpose circuits within a microprocessor or digital signal processor used to perform the product of a multiplicand and multiplier. In a typical multiplier, partial products are formed by multiplying a binary representation (which may for example be binary, two's-complement, or one's-complement form) of the multiplicand times a binary representation of the multiplier to form a two-dimensional array of partial products. The partial products are reduced, that is added together, to obtain a binary representation of the product.

The partial products may be reduced in any of several known methods. With the least significant bit (LSB) of the multiplicand and multiplier on the right, the LSB of the product will also be on the right. The conventional way to reduce partial products is to start at the right and proceed to the left (right-to-left or LSB first) with carries being shifted, or propagated, to the left. Operations reducing partial products and carry propagation are repetitive. Reduction schemes vary in complexity from as straight-forward linear reduction to Wallace's logarithmic reduction.

In a typical right-to-left carry-save multiplier, the partial products are reduced starting at the top of the array of partial products and working toward the bottom of the array. The least significant part of the final partial-product terms are generated in binary form whereas the most significant part is generated in carry-save form. The bits in the most significant part arrive simultaneously. A carry-propagate adder is used to convert them from carry-save form to binary form to complete the multiplication operation. The delay of a fast carry-propagate adder may be a significant portion of the total multiplier delay.

Left-to-right multipliers are significantly faster than right-to-left multipliers because they do not require a carry-propagate adder for the more significant partial product to complete the multiplication process. The more significant partial product terms are available in carry-save form earlier than in conventional right-to-left multipliers. The carry and sum bits in the more significant part of the final partial products do not arrive simultaneously. They are skewed with the more significant bits arriving earlier. Left-to-right multipliers exploit this property to significantly improve the speed to the multiplier.

An example of left-to-right multiplier is disclosed in a paper entitled "Fast Multiplication Without Carry Propagate Addition" by M. D. Ercegovac and T. Lang published in the IEEE Transactions on Computers, November, 1990, pages 1385–1390, the disclosure of which is hereby incorporated by reference.

The left-to-right or most significant bit first (MSB first) multiplier was extended to a full word width multiplier that produces the least significant part of the product in binary form and used a converter to convert the most significant part from carry-save to binary form is disclosed in a paper entitled "Carry-save multiplication schemes without final addition," by L. Cimininera and P. Montuschi published in the IEEE Transactions on Computers, September, 1996, pages 1050–1055, the disclosure of which is hereby incorporated by reference. In the disclosed converter, only one of the two conditional forms described in the Ercegovac and Lang paper is used along with control signals that determine if a particular digit should be incremented. This technique requires a final stage that operates the digit based on control signals.

Increasing clock frequencies, concomitantly shortening clock periods, necessitates increasing multiplier efficiency. While the left-to-right carry-free multiplier had improved the efficiency of multipliers by reducing hardware requirements and time of 10 calculating a final product, there remains a need to further reduce the chip area required to fabricate a multiplier, as well as a need to further reduce the power consumed by a multiplier, particularly in multiplication intense operations in digital signal processors.

SUMMARY OF THE INVENTION

In accordance with the present invention, a multiplier generates an array of partial products. The partial products are reduced in a converter having cells defining rows and columns. Cells adjacent to adders alternate between a cell that provides non-inverted outputs and a cell that provides inverted outputs, such that alternate rows of cells operate on non-inverted data and the intervening rows of cells operate on inverted data. A multiplexer for receiving the outputs from a row of cells may be an inverting multiplexer or a non-inverting multiplexer depending on the cell arrangement.

DETAILED DESCRIPTION

Figure 1:
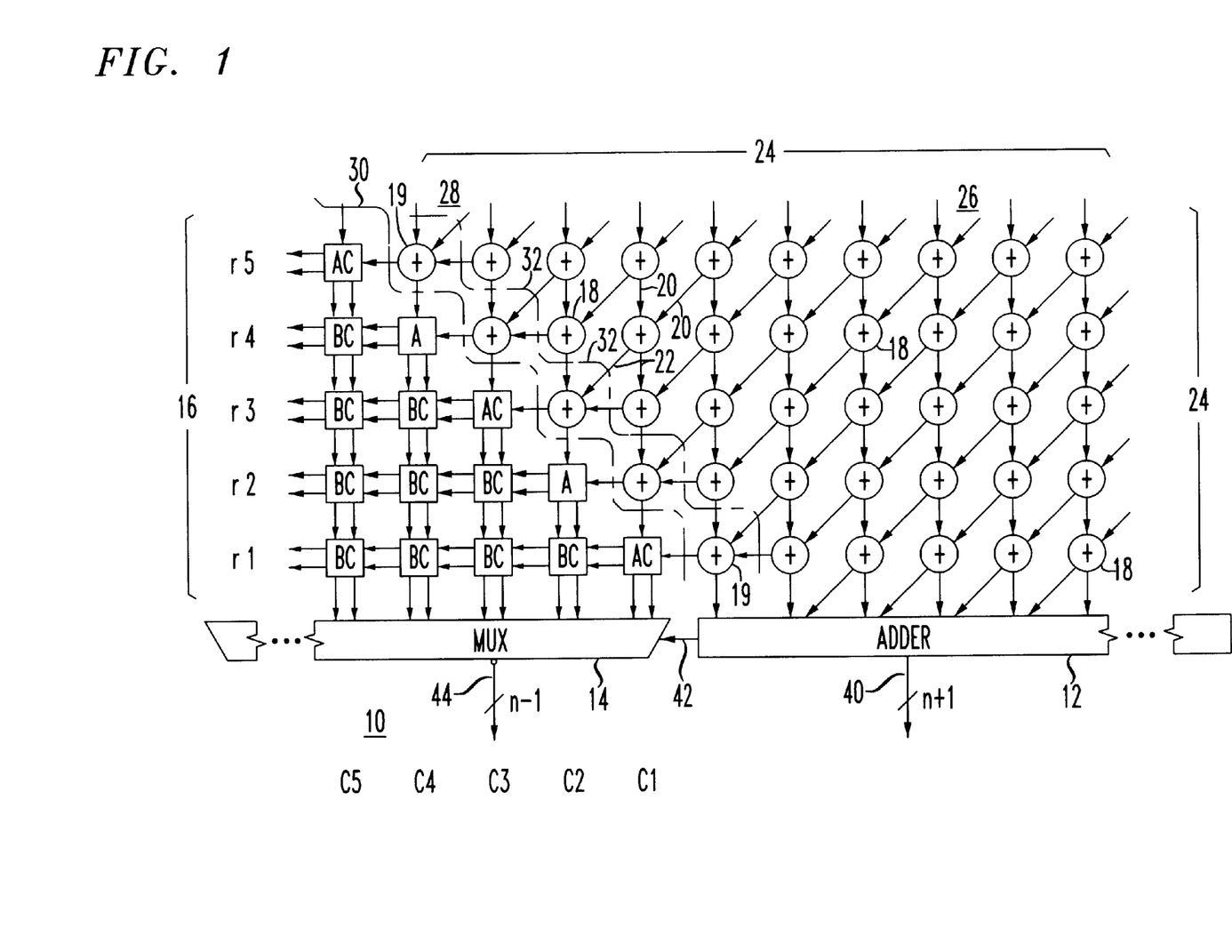
FIG. 1 is a schematic diagram of adders and a converter comprising a multiplier for producing and adding the partial product terms, and computing the product of a multiplier and multiplicand, in accordance with an illustrative embodiment of the present invention.
Figure 2:
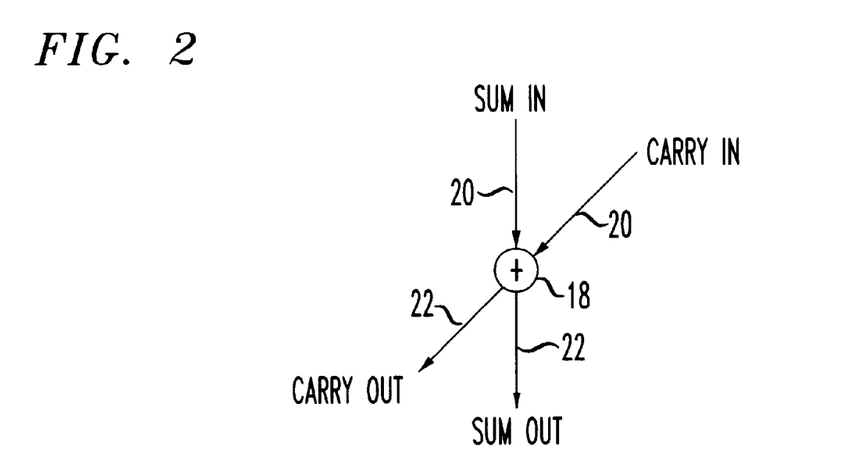
FIG. 2 is a schematic diagram of one adder cell showing the carry-in and sum-in inputs, as well as the carry-out and sum-out outputs.

FIG. 1 is an illustrative embodiment of a schematic diagram of a multiplier 10, which may be part of an integrated circuit. Multiplier 10 comprises carry propagate adder 12, multiplexer 14, converter 16, as well as adders 18 and 19. As is known in the art, adders 18 have inputs 20 and outputs 22 where outputs from one adder 18 may be inputs to other adders 18. Multiplier 10 is illustrated producing and adding the partial product terms, and thus computing the product of an n-bit multiplier and an n-bit multiplicand. As is known in the art, the product of an n-bit multiplicand with an n-bit multiplier results in a product having 2n bits. Adders 18 are arranged in rows and columns and may be full adders as is known in the art. Adders 18, as shown in FIG. 2, receive as inputs 20 the sum output from the adder above in the same column (when present), the carry-output in the next-lower significant column, and an implicit partial product bit, as is known in the art. Adder 18 adds the sum output, carry output and partial product bit to generate as outputs 22 a sum bit and a carry-out bit which are propagated through the array of adders as shown in FIG. 1. The more significant bit side 28 of the array 24 of adders is on the left as illustrated in FIG. 1, whereas the less significant bit side 26 of the array 24 of adders is on the right. The entire reduction array is not shown.

Each adder 18, excluding those adders 19 between broken lines 30 and 32, adds a partial product to the incoming sum and carry-out signals.

Carry propagate adder 12 receives the partial sum and carry-out signals from adders 18 in less significant side of array 24. Carry propagate adder 12 produces a multibit output 40 and carry-out 42. In the illustrated embodiment, multibit output 40 is n+1 bits and carry-out 42 is one bit, although the invention is not limited thereto. Carry-out 42 provides the select input to multiplexer 14, which may be an inverting multiplexer, to control the selection of inverting multiplexer 14 outputs as will be discussed in greater detail below.

Adders 19 between broken line 30 and 32 interface the adders 18 in array 24 with converter 16. Adders 19 do not add a partial product bit. They add together three bits from the array 24 and generate two outputs to converter 16.

Cells are circuits that perform a logic function as defined by associated logic expressions. Converter 16 is comprised of cells of three types, designated A, AC, and BC arranged in rows and columns. The A and AC cells receive inputs from adders 19 and provide outputs to either BC cells or multiplexer 14. An AC cell in the row of the converter adjacent to multiplexer 14 (as shown in FIG. 1) provides vertical outputs directly as inputs to multiplexer 14. The A and AC cells alternate in the rows of the converter. The vertical outputs from an A cell in the row r2 are provided as inputs to a BC cell in row r1. Since the vertical outputs (as illustrated in FIG. 1) from AC and BC cells are inverted, and since multiplexer 14 is an inverting multiplexer, to obtain the correct output from multiplexer 14, all inputs to multiplexer 14 must be inverted. To assure that the inputs to multiplexer 14 are inverted, the A, AC and BC cells are positioned such that there are an even number of signal inversions in the columns of cells of the converter. An even number of signal inversions in each column is achieved by having an even number of BC cells in each column.

Alternate rows of the converter cells operate on inverted data. As illustrated in FIG. 1, rows r1, r3, r5, etc. operate on non-inverted data whereas rows r2, r4, etc. operate on inverted data. The inputs to the row r1 cells are not inverted. The row r1 cells provide inverted outputs as inputs to multiplexer 14, which in the illustrative embodiment shown in FIG. 1 is an inverting multiplexer. The outputs of multiplexer 14 are non-inverted.

Figure 3:
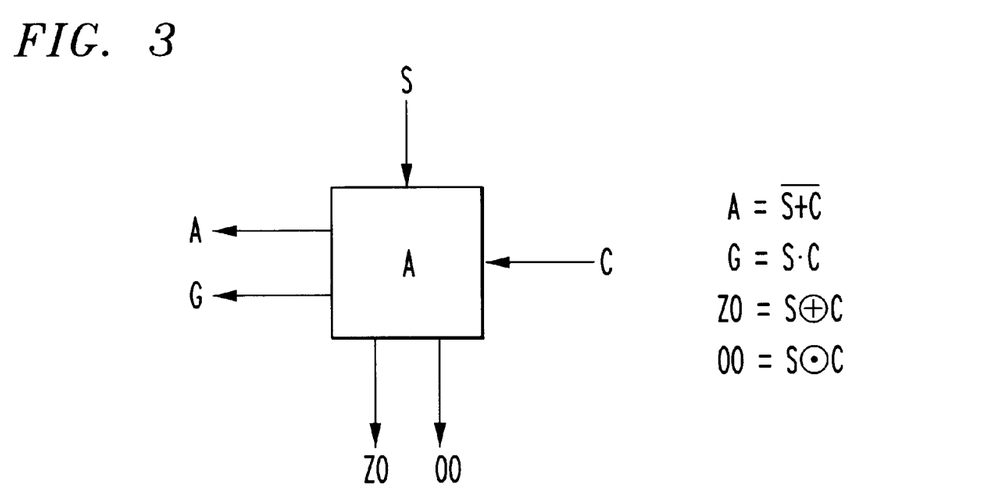
FIG. 3 is a schematic diagram of a first cell of the converter of FIG. 1.

FIG. 3 is a schematic diagram of an A cell, showing the inputs S (sum) and C (carry) as well as the outputs A, G, ZO and OO as logical combinations of the inputs. The expressions indicating how the inputs are logically combined to form the outputs are shown on the right side of FIG. 3. The symbol $\odot$ is an exclusive AND. An exclusive AND operation is equivalent to the inverse of an exclusive OR operation: $S \odot C = S \oplus C$.

Each A cell receives a carry-input from an adder 19 from the lower significant column between broken lines 30 and 32 in the same row as the A cell. Each A cell receives a sum from an adder 18 between broken lines 30 and 32 in the same column as the A cell. The reductions of the more significant bits are accomplished in the A, AC, and BC cells.

Figure 4:
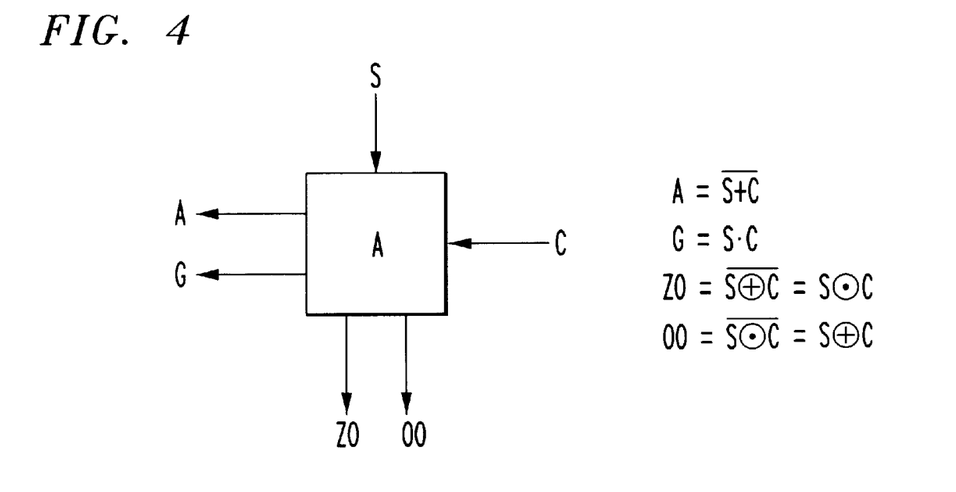
FIG. 4 is a schematic diagram of a second cell of the converter of FIG. 1.

FIG. 4 is a schematic diagram of an AC cell showing the inputs S (sum) and C (carry) as well as the outputs A, G, and ZO as logical combinations of the inputs. The expressions indicating how the inputs are logically combined to form the outputs are shown on the right side of FIG. 4. The symbol $\odot$ is an exclusive AND. An AC cell has a similar logic function to an A cell, but provides inverted outputs.

Each AC cell receives a carry-input from an adder 19 from the lower significant column between broken lines 30 and 32 in the same row as the AC cell. Each AC cell receives a sum from an adder 18 between broken lines 30 and 32 in the same column as the AC cell. The reductions of the more significant bits are accomplished in the A, AC, and BC cells such that the inputs to multiplexer 14 are available either prior to or simultaneously with the carry-out 42 of carry-propagate adder 12. In this manner, the sum 44 is available as the output from multiplexer 42 one multiplexer delay after the carry-out 42 from carry-propagate adder 12 is available. The skew present in the more significant side of the array assists in generating the more significant inputs to multiplexer 14 being available earlier than or simultaneously with carry-out 42, which is the select input to multiplexer 14.

Figure 5:
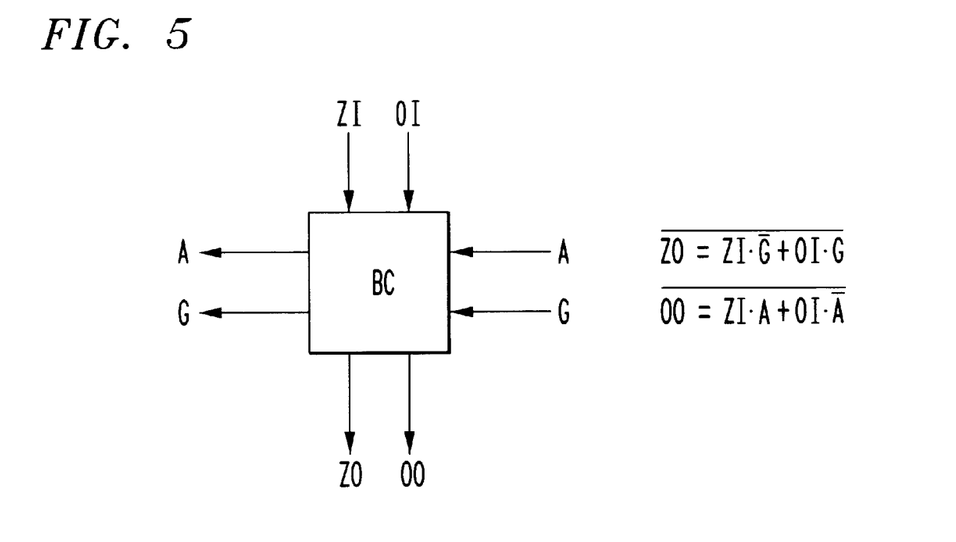
FIG. 5 is a schematic diagram of a third cell of the converter of FIG. 1.

FIG. 5 is a schematic diagram of a BC cell, showing inputs ZI and OI (which are received from outputs ZO and OO of an A cell or AC cell in the same column of the converter) as well as inputs A and G received from an A cell or AC cell in the same row of the converter. Each BC cell passes inputs A and G to adjacent BC cells (to the left as shown in FIG. 1), where present, and generates outputs ZO and OO. Outputs ZO and OO are logical combinations of the inputs to cell BC. The expressions indicating how the inputs are logically combined to form the outputs in each BC cell are shown on the side of FIG. 5.

The A, AC, and BC cells, based on the logical relationship between the inputs and outputs, and the interconnection architecture, compute and maintain two forms of the sum or reduced-products of the more significant bits of the product. Converter 16 computes a sum or reduced product of the more significant bits that assumes carryout 42 from carry propagate adder 12 will be a first logical state, such as a logical zero. Converter 16 also computes a sum or reduced product of the more significant bits that assumes carry-out 42 from carry propagate adder 12 will be a second logical state, such as a logical one. The outputs of the bottom row of AC and BC cells provide the two sums as inputs to multiplexer 14. One of the sums is represented by the ZO outputs of the AC and BC cells; the other sum is represented by the OO outputs.

When carry-propagate adder 12 has completed calculating and carry-out 42 is available, the correct one of the two sums or reduced products computed by converter 16 is selected by multiplexer 14. When carry-out 42 from carry-propagate adder 12 takes on a first state, a first sum calculated by converter 16 is selected as the output of multiplexer 14. When carry-out 42 from carry-propagate adder 12 takes on a second state, a second sum calculated by converter 16 is selected as the output of multiplexer 14. The first sum could be, for example, represented by the ZO inputs to multiplexer 14 whereas the second sum could be, for example, represented by the OO inputs to multiplexer 14.

In the illustrative embodiment, multiplexer 14 provides n−1 outputs 44 and carry-propagate adder 12 provides n+1 outputs 40 which collectively are the 2n bits of the product. The outputs 44 from the multiplexer 14 are the most significant bits of the product; the outputs 42 from carry propagate adder 12 are the least significant bits of the product. One digit is reduced between the broken line 30 and 32 in FIG. 1. For this reason, the number of bits output from carry-propagate adder 40 is one greater than the number of bits output from multiplexer 14. A digit is log base 2 of the radix.

The precise line of demarcation between the less significant side of array 26 and the more significant side of array 26 may vary depending on the number of bits in the multiplier and the multiplicand.

Figure 6:
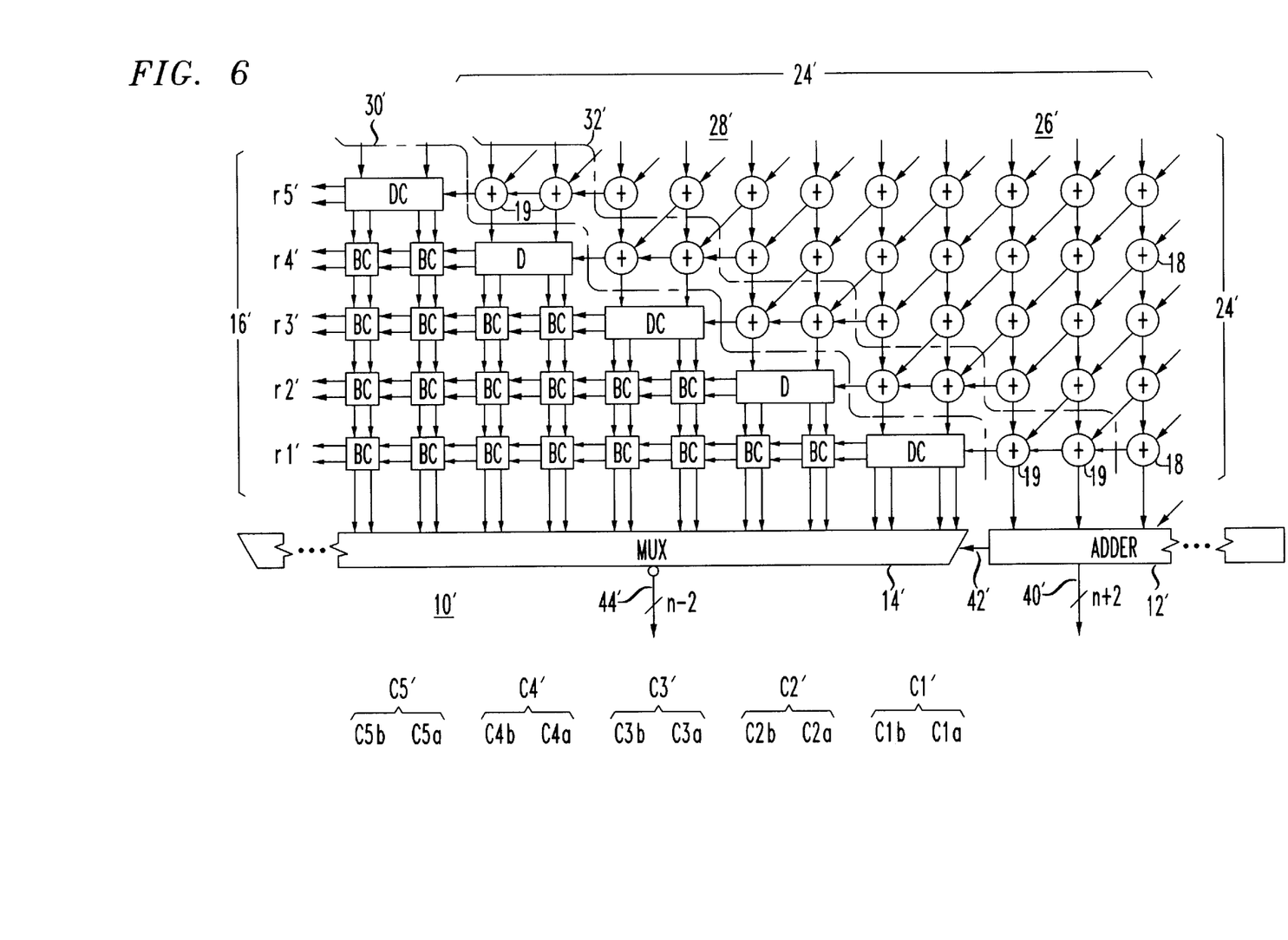
FIG. 6 is a schematic diagram of an illustrative embodiment of a higher radix multiplier.

FIG. 6 shows a schematic diagram of a converter in a radix-4 multiplier. Elements that provide a similar function to elements in the FIG. 1 embodiment are shown with the same reference numeral and a prime. In the radix-4 converter, two bits, are produced by each D-cell and each DC cell as compared to one bit being produced by an A cell, an AC cell, or a BC cell in the converter for a radix-2 multiplier shown in FIG. 1. The number of bits output from carry-propagate adder 12' as output 40' is four greater than the number of bits output from multiplexer 14' due to two digits being reduced between broken lines 30' and 32'.

Figure 7:
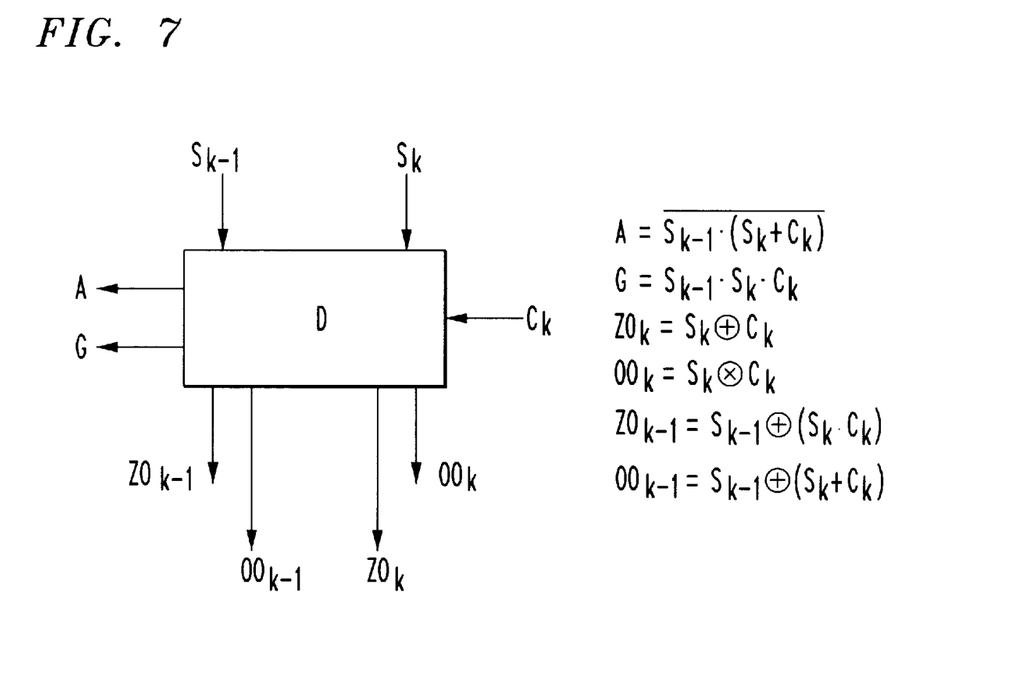
FIG. 7 is a schematic diagram of a fourth cell of the converter of FIG. 6.

To generate the radix-4 multiplier of FIG. 6, the type A cells in the radix-2 multiplier of FIG. 1 are replaced with type D cells due to the operands being radix-4. FIG. 7 is a schematic diagram of a D cell, showing inputs $S_{k-1}$, and $S_k$ (which are outputs received from adder cells above the D cell in the column as the D cell) as well as carry $C_k$ received from an adder cell in the same row as the D cell. Each D cell provides outputs A and G as inputs to an adjacent BC cell (to the left as shown in FIG. 6), where present, in the same row of the converter as the D cell and generates outputs ZO and OO. Outputs ZO and OO are logical combinations of the inputs to cell D. The expressions indicating how the inputs are logically combined in each D cell to form the outputs from each D cell are shown on the side of FIG. 7.

Figure 8:
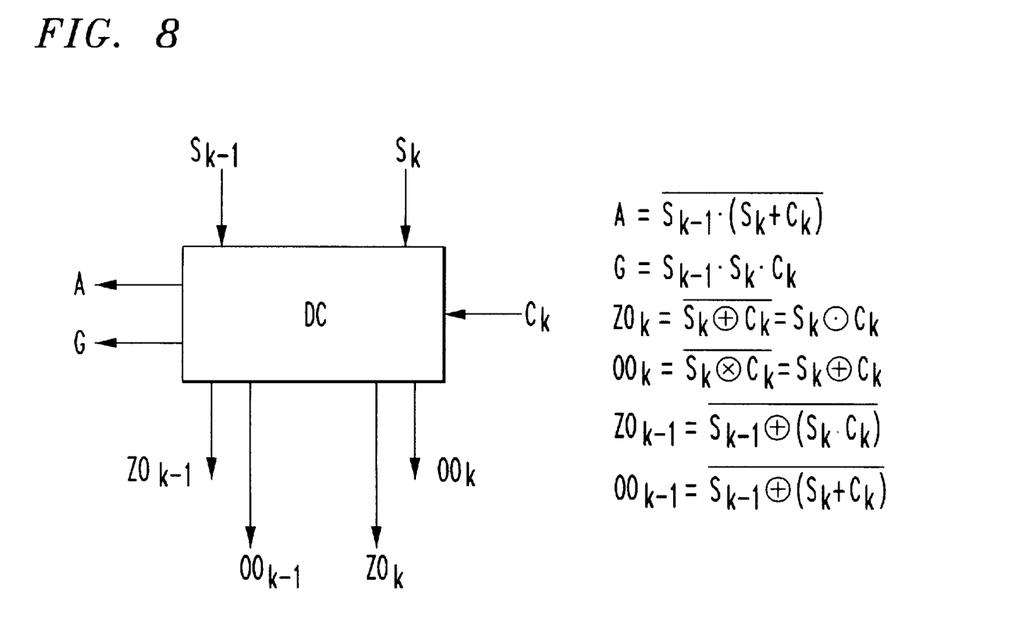
FIG. 8 is a schematic diagram of the complement of the converter of FIG. 6.

Similarly, to generate the radix-4 multiplier of FIG. 6, the type AC cell in the FIG. 1 radix-2 multiplier is replaced with a type DC cell due to the operands being radix-4. FIG. 8 is a schematic diagram of a DC cell, showing inputs $S_{k-1}$ and $S_k$ (which are outputs received from adder cells in the columns above the DC cell) as well as carry $C_k$ received from an adder cell in the same row of the converter as the DC cell. Each DC cell provides outputs A and G as inputs to an adjacent BC cell (to the left as shown in FIG. 6), where present, in the same row of the converter and generates outputs ZO and OO. Outputs ZO and OO are logical combinations of the inputs to cell DC. The expressions indicating how the inputs are logically combined in each DC cell to form the outputs from each DC cell are shown on the side of FIG. 8. A DC cell has a similar logic function to a D cell, but provides inverted outputs. Alternate rows of the converter 16' operate on inverted data. As illustrated in FIG. 6, rows r1', r3', r5', etc. operate on non-inverted data whereas rows r2', r4', etc. operate on inverted data. The inputs to the row r1' cells are not inverted. The row r1' cells provide inverted outputs as inputs to multiplexer 14', which in the illustrative embodiment shown in FIG. 6, is an inverting multiplexer. The outputs of multiplexer 14' are non-inverted.

Figure 9:
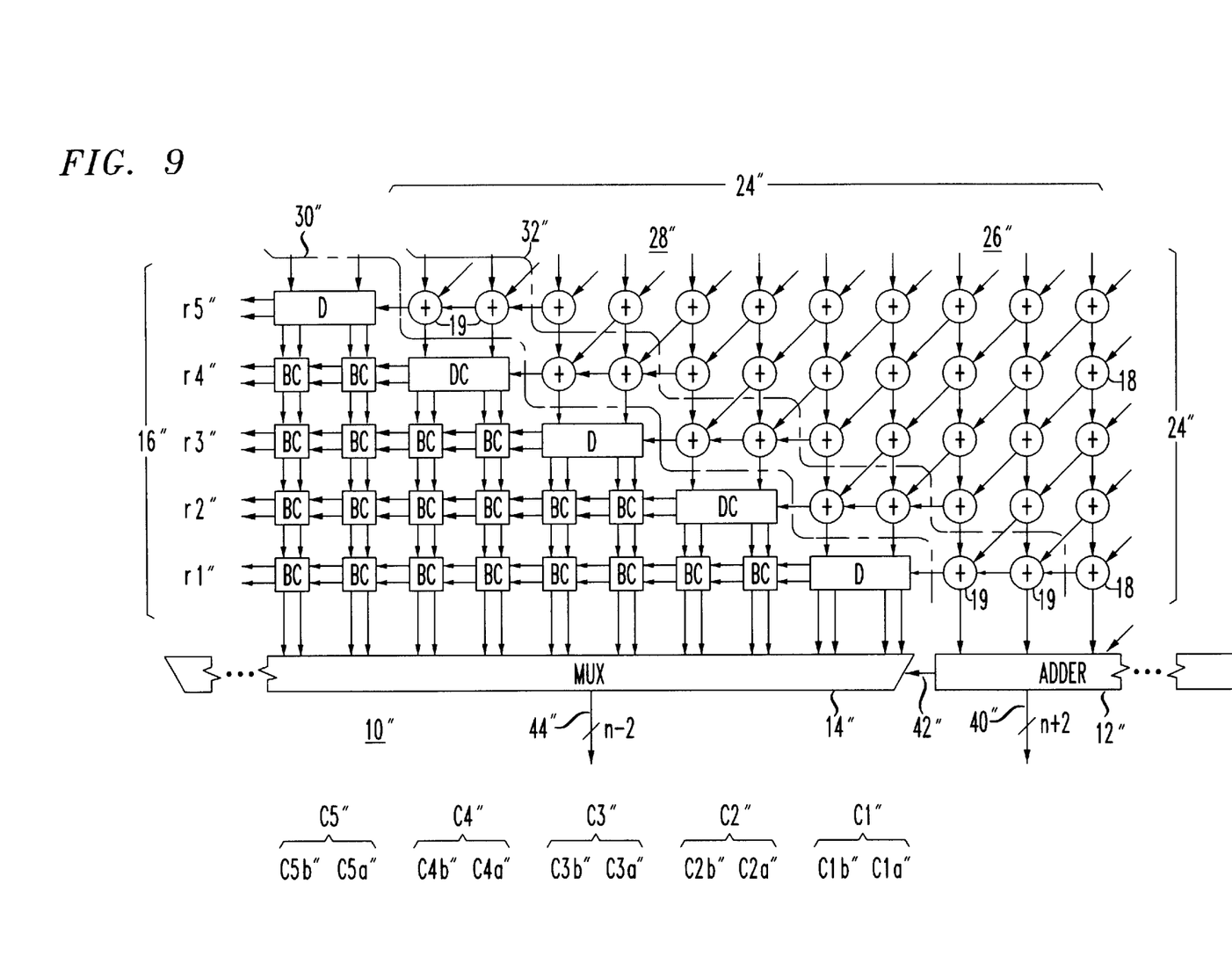
FIG. 9 is a schematic diagram of an alternate embodiment higher radix multiplier.

FIG. 9 is a schematic diagram of an alternative illustrative embodiment radix-4 multiplier in accordance with the invention. Multiplexer 14" is a non-inverting multiplexer. As compared to the radix-4 embodiment multiplier illustrated in FIG. 6, the position of the D cells and DC cells are reversed. Thus while alternate rows of cells in the converter operate on inverted data, as illustrated in FIG. 9 rows r1", r3", r5", etc. operate on inverted data, whereas rows r2", r4", etc. operate on non-inverted data. The inputs to row r1" are inverted. The cells in row r1" provide non-inverted outputs as inputs to multiplexer 14". The outputs of multiplexer 14" are non-inverted. In the embodiment of the invention illustrated in FIG. 9, the cell providing the least significant bit or bits to multiplexer 14" provides non-inverting outputs, and cells proximate the adder cells alternate between non-inverted outputs and inverted outputs. The D and DC cells alternate in the rows of the converter. For example, row r1" includes a D cell, row r2" includes a DC cell, row r3" includes a D cell, row r4" includes a DC cell, and so forth. All inputs to multiplexer 14" are non-inverted. The BC D and DC cells are positioned such that there are an even number of signal inversions in the columns of cells of the converter.

Although the invention is illustrated in radix-2 embodiment in FIG. 1 and radix-4 embodiment in FIGS. 6 and 9, the invention is not limited thereto. The invention can be extended to higher radix applications.

While the illustrative embodiment has disclosed converters 16, 16' and 16" as converting at the bit level, one skilled in the art could adapt the invention to convert groups of bits at a time.

The invention may be fabricated using known VLSI processes in one or more integrated circuits. The invention is particularly useful in communication systems and equipment employing integrated circuits including this technique. Such communications systems and equipment have the advantage of increased speed to accomplish signal processing. Multipliers in accordance with the present invention provide partial products in a manner that the more significant bits are available earlier than known multipliers, thereby reducing the time required to complete a multiplication. The invention is useful with many reduction schemes, types of multipliers, and radixes. The invention may be used with any radix-2 array multiplier such as the Bauah-Wooley-Blankenship encoded two's complement multiplier, the Booth-MacSorley multiplier, or any higher-radix multiplier.

While the illustrative embodiment of the invention has not been described as incorporating pipelining, one skilled in the art would recognize the enhanced computation efficiently available by utilizing pipelining in the design. Pipelining is achieved by initiating computation with a new data set before completing computations with a previous set of data. The more latches used in pipelining, the greater the depth of pipelining. Pipelining causes an initial latency in computation time required to fill the pipeline, but maximizes the use of resources such as adders and multiplexers.

We claim:

1. A method of performing multiplication, comprising the steps of:

generating an array of partial products;

reducing partial products in a more significant side of the array to produce a first set of reduced products by inverting intermediate results in each row of a reducing circuit;

reducing partial products in the more significant side of the array to produce a second set of reduced products by inverting intermediate results in each row of the reducing circuit;

selecting as reduced products of the more significant side of the array the first set of reduced products when a carry-out from a less significant side of the array takes on a first state, and the second set of reduced products when the carry-out from the less significant side of the array takes on a second state.

2. A method of performing multiplication as recited in claim 1, further comprising the step of:

inverting the selected set of reduced products to produce the reduced products.

3. A method of performing multiplication as recited in claim 2, further comprising the step of:

reducing the partial products in the less significant side of the array to produce a carry-out.

4. The method of performing multiplication as recited in claim 3, wherein the step of reducing the partial products in the less significant side of the array further comprises producing a sum of the partial products in the less significant side of the array.

5. The method of performing multiplication as recited in claim 2, wherein the selecting occurs at a bit level.

6. The method of performing multiplication as recited in claim 2, wherein the selecting occurs at a group of bits level.

7. A method of performing multiplication as recited in claim 1, further comprising the step of:

reducing the partial products in the less significant side of the array to produce a carry-out.

8. The method of performing multiplication as recited in claim 7, wherein the step of reducing the partial products in the less significant side of the array further comprises producing a sum of the partial products in the less significant side of the array.

9. The method of performing multiplication as recited in claim 1, wherein the selecting occurs at a bit level.

10. The method of performing multiplication as recited in claim 1, wherein the selecting occurs at a group of bits level.

11. A multiplier, comprising:

a plurality of adders to generate an array of partial products;

a plurality of cells to reduce partial products, the cells defining rows and columns, cells at an end of a row adjacent to one of the adders alternating in rows from a cell that provides non-inverting outputs in one row to a cell that provides inverted outputs in an adjacent row, whereby intermediate results produced by alternate rows of cells are non-inverted whereas the intermediate results produced by intervening rows of cells are inverted.

12. A multiplier as recited in claim 11, further comprising a multiplexer adapted to receive outputs from a row of cells.

13. A multiplier as recited in claim 12, wherein the multiplexer is an inverting multiplexer.

14. A multiplier as recited in claim 12, wherein the multiplexer is a non-inverting multiplexer.

15. A multiplier as recited in claim 11, fabricated as an integrated circuit.

* * * * *